United States Patent
Iinuma

(10) Patent No.: US 10,405,313 B2
(45) Date of Patent: Sep. 3, 2019

(54) BASE STATION AND WIRELESS COMMUNICATION METHOD

(71) Applicant: KYOCERA CORPORATION, Kyoto (JP)

(72) Inventor: Toshinori Iinuma, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/751,195

(22) PCT Filed: Aug. 4, 2016

(86) PCT No.: PCT/JP2016/072986
§ 371 (c)(1),
(2) Date: Feb. 8, 2018

(87) PCT Pub. No.: WO2017/026374
PCT Pub. Date: Feb. 16, 2017

(65) Prior Publication Data
US 2018/0234972 A1 Aug. 16, 2018

(30) Foreign Application Priority Data
Aug. 11, 2015 (JP) .................................. 2015-158698

(51) Int. Cl.
*H04W 16/14* (2009.01)
*H04W 72/04* (2009.01)
(Continued)

(52) U.S. Cl.
CPC ........... *H04W 72/0453* (2013.01); *H04L 5/14* (2013.01); *H04W 16/14* (2013.01); *H04W 88/08* (2013.01)

(58) Field of Classification Search
CPC combination set(s) only.
See application file for complete search history.

(56) References Cited

U.S. PATENT DOCUMENTS

| | | |
|---|---|---|
| 2012/0207033 A1 | 8/2012 | Hakola et al. |
| 2013/0114587 A1* | 5/2013 | Khoryaev ............. H04L 5/0094 370/343 |
| 2015/0078325 A1* | 3/2015 | Kishiyama ........... H04J 11/0056 370/330 |

FOREIGN PATENT DOCUMENTS

| | | |
|---|---|---|
| JP | 2000-022712 A | 1/2000 |
| JP | 2013-005283 A | 1/2013 |
| JP | 2017-038255 A | 2/2017 |

OTHER PUBLICATIONS

International Search Report issued in PCT/JP2016/072986; dated Nov. 1, 2016.

(Continued)

*Primary Examiner* — Lakeram Jangbahadur
(74) *Attorney, Agent, or Firm* — Studebaker & Brackett PC

(57) ABSTRACT

Provided are a base station and a wireless communication method with which it is possible to avoid the effect of interference affecting another wireless communication system in a common band of wireless communication, and to provide high-speed communication service. The present invention has a configuration provided with a base station (30x) in which, when the other wireless communication system is not using the common band, a 3 MHz or 5 MHz carrier of the host system is used in which throughput is improved in comparison to a carrier having the frequency width of the other wireless communication system, and when the other wireless communication system is using the common band, a 1.4 MHz carrier of the host system is used having a smaller frequency width than the other wireless communication system.

6 Claims, 3 Drawing Sheets

(51) Int. Cl.
*H04L 5/14* (2006.01)
*H04W 88/08* (2009.01)

(56) References Cited

OTHER PUBLICATIONS

3rd Generation Partnership Project; Technical Specification Group Radio Access Network; Evolved Universal Terrestrial Radio Access (E-UTRA); Physical Channels and Modulation; 3GPP TS 36.211 V9.0.0; Dec. 2009; pp. 1-85; Release 9; 3GPP Organizational Partners.
3rd Generation Partnership Project; Technical Specification Group Radio Access Network; Evolved Universal Terrestrial Radio Access (E-UTRA); User Equipment (UE) radio transmission and reception; 3GPP TS 36.101 V9.0.0; Jun. 2009; pp. 1-142; Release 9; 3GPP Organizational Partners.
Ranga Reddy, "TGb LB1 CID 232 Discussion", IEEE 802.22-14/0060r0, IEEE mentor, Mar. 31, 2014.

\* cited by examiner

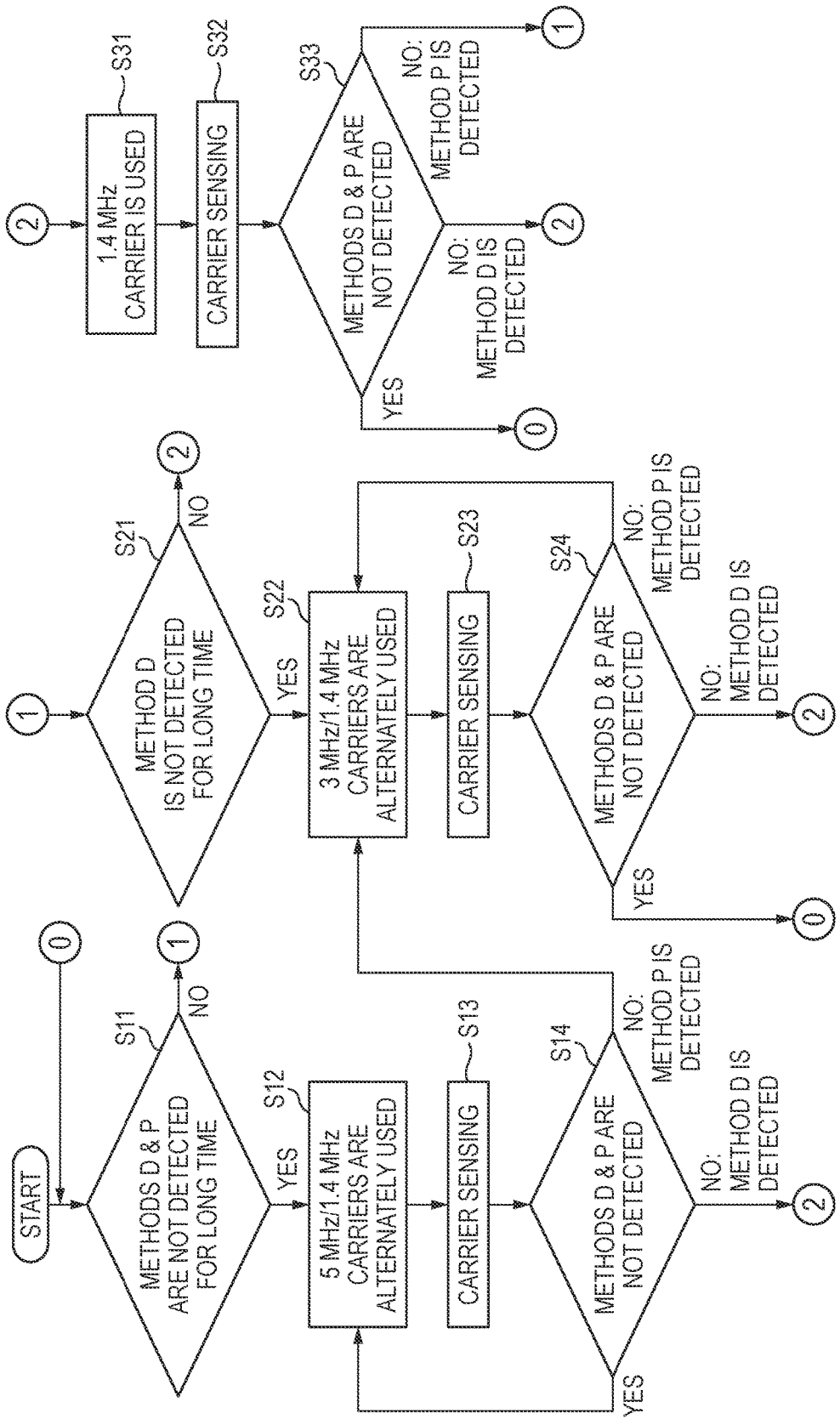

BASE STATION AND WIRELESS COMMUNICATION METHOD

TECHNICAL FIELD

The present invention relates to a base station that performs wireless communication and a wireless communication method.

BACKGROUND ART

As a frequency band of PHS (Personal Handy-phone System), 1884.5 MHz to 1915.7 MHz are allocated. In the frequency band, 1893.5 MHz to 1906.1 MHz are a common band for public and private use. In the common band, public PHS, private PHS, DECT (Digital Enhanced Cordless Telecommunications) and the like are available.

In future, in the common band, it is expected to use an XGP (eXtended Global Platform) wireless communication method that realizes M2M (Machine-to-Machine), IoT (Internet of Things) and the like, and a high quality communication service of high speed, low delay and the like is considered.

For example, in a TD-LTE (Time Division duplex-Long Term Evolution) wireless communication method used in the XGP method, a carrier used in transmission may take frequency bandwidths (hereinafter, referred to as bandwidths) of 1.4 MHz, 3 MHz, 5 MHz, 10 MHz, and 20 MHz (Non-Patent Literatures 1 and 2, and the like). The number of resource blocks (RBs) included in each bandwidth is 6 RBs, 15 RBs, 25 RBs, 50 RBs, and 100 RBs, respectively, and the communication speed becomes fast as the bandwidth is widened.

CITATION LIST

Non-Patent Literature

Non-Patent Literature 1: 3GPP TS 36.101 Ver. 9.0.0 "LTE; Evolved Universal Terrestrial Radio Access (U-UTRA); User Equipment (UE) radio transmission and reception"

Non-Patent Literature 2: 3GPP TS 36.211 Ver. 9.0.0 "LTE; Evolved Universal Terrestrial Radio Access (U-UTRA); Physical channels and modulation"

SUMMARY OF THE INVENTION

Technical Problem

In the aforementioned common band, when a base station of the TD-LTE method uses a relatively wide bandwidth, a system used in another wireless communication method may be interfered.

The present invention has been made in consideration of the aforementioned problems, and an object thereof is to provide a base station and a wireless communication method in which effects of interference to a wireless communication system used in another wireless communication system are avoided in a common band for wireless communication.

Solution to Problem

A base station of the invention is a base station of a wireless communication system that commonly uses the same frequency band with another wireless communication system, wherein the base station uses a carrier of a wide frequency width of own system, in which throughput is improved in comparison to a carrier having a frequency width of the other wireless communication system when the other wireless communication system does not use the frequency band, and uses a carrier of a narrow frequency width of own system, which is narrower than the frequency width of the other wireless communication system, when the other wireless communication system uses the frequency band.

Furthermore, the base station of the invention is configured to alternately use the carrier of the wide frequency width and the carrier of the narrow frequency width by temporally switching the carrier of the wide frequency width and the carrier of the narrow frequency width when the other wireless communication system does not use the frequency band.

In the base station of the invention, the other wireless communication system includes a first wireless communication system and a second wireless communication system having a carrier using a narrower frequency width than a frequency width of a carrier in the first wireless communication system, and the base station uses a carrier of an intermediate frequency width of own system, in which throughput is improved in comparison to the frequency width of the other wireless communication system when the first wireless communication system does not use the frequency band and the second wireless communication system uses the frequency band, the intermediate frequency width being narrower than the wide frequency width.

The base station of the invention is configured to alternately use the carrier of the intermediate frequency width and the carrier of the narrow frequency width by temporally switching the carrier of the intermediate frequency width and the carrier of the narrow frequency width when the first wireless communication system does not use the frequency band and the second wireless communication system uses the frequency band.

Furthermore, the base station of the invention is configured to initially use the carrier of the wide frequency width for a short time and gradually use the carrier of the wide frequency width for a long time when the carrier of the wide frequency width is used.

A wireless communication method of the present invention is a wireless communication method of a wireless communication system that commonly uses the same frequency band with another wireless communication system, and includes steps of, using a carrier of a wide frequency width of own system, in which throughput is improved in comparison to a frequency width of the other wireless communication system when the other wireless communication system does not use the frequency band, and using a carrier of a narrow frequency width of own system, which is narrower than the frequency width of the other wireless communication system when the other wireless communication system uses the frequency band.

According to the base station and the wireless communication method of the invention, effects of interference to the other wireless communication system are avoided in the common band for wireless communication.

BRIEF DESCRIPTION OF THE DRAWINGS

FIG. 5 is a flowchart illustrating an operation example according to the embodiment of the invention.

DESCRIPTION OF EMBODIMENTS

Hereinafter, an embodiment of the invention is described with reference to the drawings.

Figure 1:
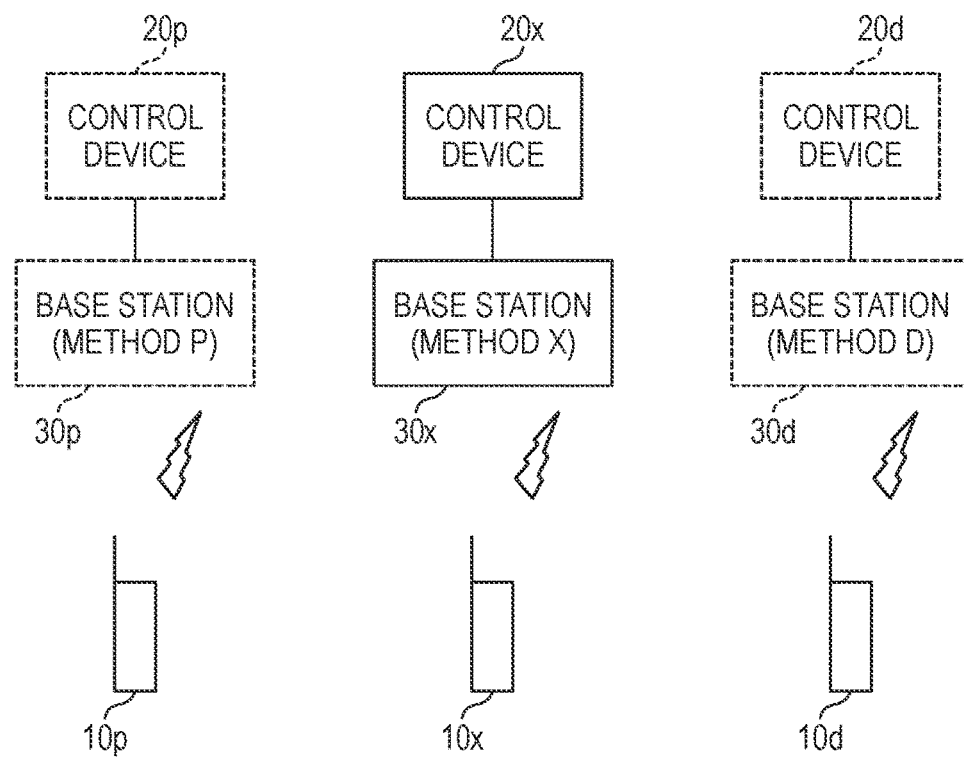
FIG. 1 is a diagram illustrating an operation of wireless communication according to an embodiment of the invention.

FIG. 1 is a diagram illustrating an operation of wireless communication according to the embodiment of the invention. In FIG. 1, a wireless communication system corresponding to a plurality of wireless communication methods is operated, and includes wireless terminals 10$p$, 10$x$, and 10$d$, base stations 30$p$, 30$x$, and 30$d$, which correspond to the respective wireless communication methods, and control devices 20$p$, 20$x$, and 20$d$ that respectively control the base stations 30$p$, 30$x$, and 30$d$.

For example, the wireless terminal 10$p$ and the base station 30$p$ correspond to the wireless communication method P, the wireless terminal 10$x$ and the base station 30$x$ correspond to the wireless communication method X, and the wireless terminal 10$d$ and the base station 30$d$ correspond to the wireless communication method D.

In the embodiment of the invention, it is assumed that the base station 30$x$ exists; however, at least one of the base station 30$p$ and the base station 30$d$ may exist around the base station 30$x$ or the base station 30$p$ or the base station 30$d$ may not exist. For example, when a wireless network is privately operated, at least one of the base station 30$p$ and the base station 30$d$ may exist.

FIG. 1 illustrates three types of wireless communication methods; however, the invention is not limited to the three types.

These wireless communication methods are operated in a common band commonly using the same frequency band. The common band is described below.

Figure 2:
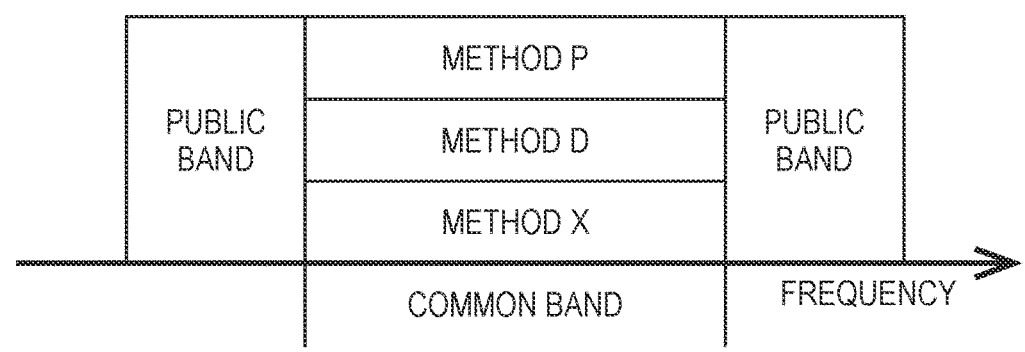
FIG. 2 is a diagram for explaining a common band according to the embodiment of the invention.

FIG. 2 is a diagram for explaining the common band according to the embodiment of the invention.

For example, as illustrated in FIG. 2, the common band exists in a public band which is a frequency band for public use. The common band uses the wireless communication method P, the wireless communication method X, and the wireless communication method D (hereinafter, simply referred to as a method P, method X, and a method D respectively). All the wireless communication methods are not used in the common band. In a facility such as a hospital and an office, a specific area and the like, one or more wireless communication methods are used; however, all the wireless communication methods may not be used.

Next, a carrier of a frequency width used in the common band is described.

Figure 3:
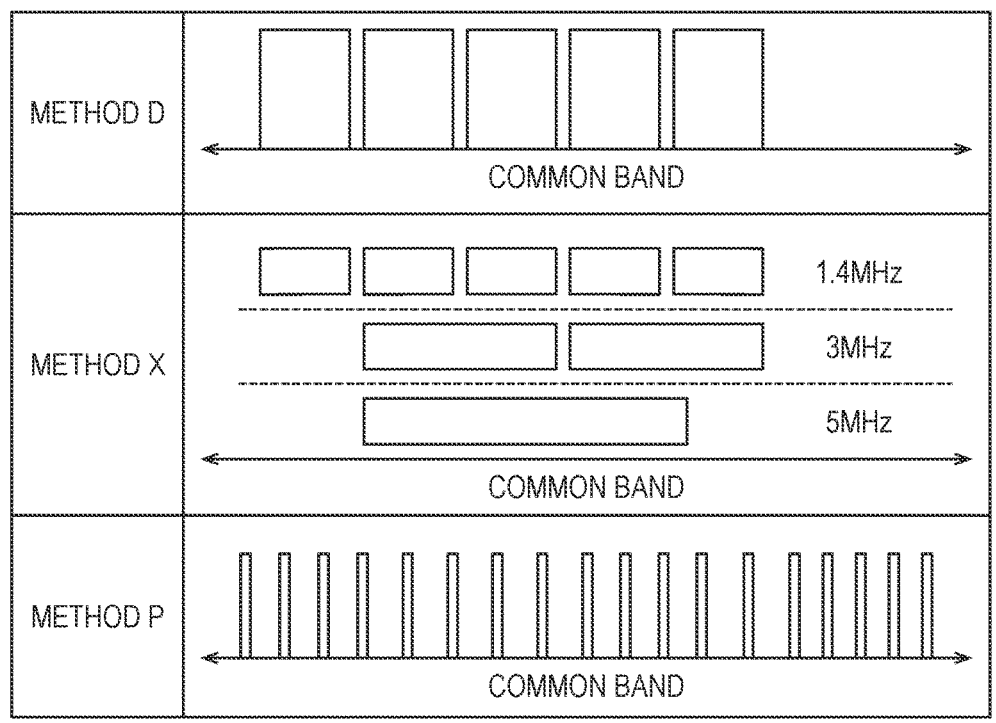
FIG. 3 is a diagram for explaining a carrier according to the embodiment of the invention.

FIG. 3 is a diagram for explaining a carrier according to the embodiment of the invention.

In a system using the method D (a first wireless communication system), there are five carriers having a predetermined frequency width in a common band as illustrated in FIG. 3, and maximum five carriers are used.

In a system using the method X, it is considered to use a TD-LTE method, there are five carriers having a frequency width of 1.4 MHz width in the common band as illustrated in FIG. 3, and maximum five carriers are used. As another type, there are two carriers having a frequency width of 3 MHz width in the common band as illustrated in FIG. 3, and maximum two carriers are used. Furthermore, as another type, there is one carrier having a frequency width of 5 MHz width in the common band as illustrated in FIG. 3.

In a system using the method P (a second wireless communication system), there are 18 carriers having a predetermined frequency width in the common band as illustrated in FIG. 3, and maximum 18 carriers are used.

The throughput of a carrier of 1.4 MHz width (a narrow frequency width) of the method X is lower than that of a carrier of the method D, and the throughput of a carrier of 3 MHz width (a wide frequency width or an intermediate frequency width) and a carrier of 5 MHz width (a wide frequency width) of the method X is higher than that of the carrier of the method D. However, since the carrier of 3 MHz width and the carrier of 5 MHz width of the method X may give interference to other wireless communication systems due to a wide band.

Next, the base station according to the embodiment of the invention is described.

Figure 4:
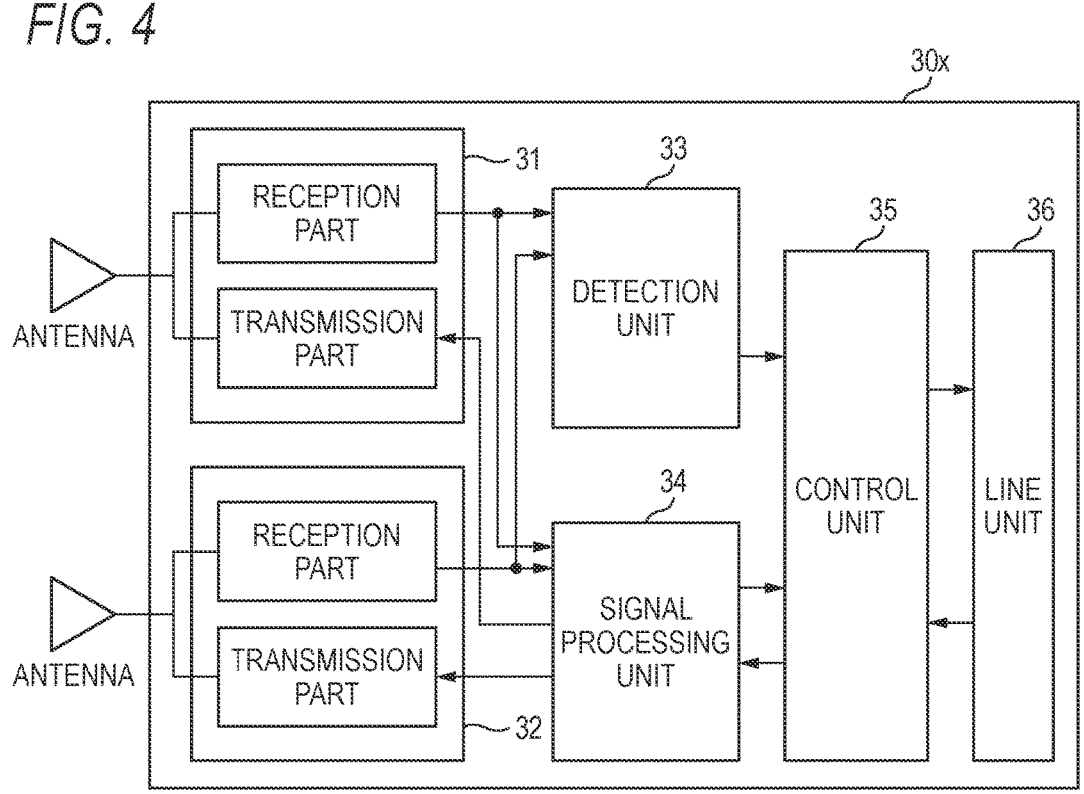
FIG. 4 is a block diagram of a base station which is an object according to the embodiment of the invention.

FIG. 4 is a block diagram of the base station using the method D.

The base station 30$x$ includes two radio units 31 and 32, a detection unit 33 related to carrier sensing, a signal processing unit 34 that processes a radio signal, a control unit 35 that controls various operations, and a line unit 36 that communicates with a network.

The radio unit 31 performs wireless communication by using the TD-LTE method. A reception part of the radio unit 31 outputs a radio signal received from the wireless terminal 10$x$ to the signal processing unit 34. A transmission part of the radio unit 31 transmits information outputted from the signal processing unit 34 to the wireless terminal 10$x$ as a radio signal.

The radio unit 32, for example, performs carrier sensing during communication of the radio unit 31. A reception part of the radio unit 32 outputs a received radio signal to the signal processing unit 34. A transmission part of the radio unit 32 transmits information outputted from the signal processing unit 34 as a radio signal.

The detection unit 33 detects a carrier from a radio signal, and outputs, to the control unit 35, carrier sensing information when the carrier sensing is performed.

The signal processing unit 34 processes the radio signals from the reception parts of the radio unit 31 and the radio unit 32 and outputs obtained information to the control unit 35. Furthermore, the signal processing unit 34 outputs information outputted from the control unit 35 to the transmission parts of the radio unit 31 and the radio unit 32 as a radio signal.

The control unit 35 is configured with a CPU, a memory and the like and controls various operations, and the line unit 36 is a network interface for communicating with the control device 20$x$ and the network.

Next, the operation of the control unit 35 of the base station 30$x$ is described.

As described in FIG. 3, the base station 30$x$ uses carriers of the frequency widths of 1.4 MHz, 3 MHz, and 5 MHz; however, when using the 3 MHz and 5 MHz carriers, since the carriers are not available in other wireless communication systems in the common band, the use of the 3 MHz and 5 MHz carriers is limited.

For example, the base station 30$x$ performs the following operations.

The base station 30$x$ detects the presence or absence of another wireless communication system operating carrier sensing at the start of communication. When the other wireless communication system is detected, the base station 30$x$ selects an operation for reducing (enabling coexistence) an influence to the detected other wireless communication system and starts operations.

When another wireless communication system performing carrier sensing during the operation is further detected, the base station 30x performs switching to an operation for reducing an influence to the system and continues the operations.

The operation for reducing an influence to the other wireless communication system indicates an operation for reducing pre-interference to the other wireless communication system, and for example, indicates reducing the number of frequency channels (a wave number) used in a current operation, reducing a frequency bandwidth, lowering transmission output, shortening a transmission time (lowering transmission duty), and the like.

When another wireless communication system is not detected for a prescribed time, the base station 30x performs an operation for increasing an influence to another wireless communication system in contrast to the aforementioned operation.

The aforementioned affecting operation is decided in consideration of a detected system, a level when another wireless communication system is detected, detection frequency and the like.

The operation also includes switching of a plurality of operations. For example, switching to a carrier of a wide frequency bandwidth is performed, an operation is performed for a prescribed time, the carrier is switched to a carrier of a narrow frequency bandwidth, and then the operation is performed for a prescribed time. Alternatively, it indicates that an operation using a large number of frequency channels is performed for a prescribed time and then an operation using a small number of frequency channels is performed.

When the base station 30x switches a plurality of operations, an operating time of each operation reflects a result of carrier sensing. For example, it indicates that when a non-detection time of another wireless communication system in the carrier sensing is long, an operating time of an operation for increasing an influence to another wireless communication system (for example, a frequency bandwidth is wide, the number of frequency channels is large, and the like) is prolonged, but when another wireless communication system is detected, an operation for reducing an influence to the other wireless communication system is prolonged.

When there is a change in the width of a frequency band commonly used, there is also a change in an operation to be selected in the carrier sensing. For example, when a frequency width is extended, an operation (for example, an influence to another wireless communication system is large), which is different from an operation before extension even though a system detected in the carrier sensing, a detection level, and detection frequency are the same, is selected. Furthermore, when a frequency band to be commonly used is reduced, an operation opposite to the aforementioned operation is performed.

Another wireless communication system means that it is not a system privately operated, and a wireless communication method includes both the same method and different methods.

Next, an example of the operations of the control unit 35 of the base station 30x is described using a flowchart. FIG. 5 is a flowchart illustrating an operation example according to the embodiment of the invention.

The control unit 35 performs carrier sensing for a long time (for example, 24 hours and the like) at the start of wireless communication and confirms whether carriers of the method D and the method P are detected (S11).

When the carriers are not detected, the control unit 35 alternately uses a 5 MHz carrier and a 1.4 MHz carrier (S12). For example, in this case, as illustrated in FIG. 3, the control unit 35 operates the 5 MHz carrier for a prescribed time (for example, 3 hours and the like), switches the 5 MHz carrier to the 1.4 MHz carrier, operates the 1.4 MHz carrier for a prescribed time (for example, one hour and the like), operates the 5 MHz carrier for a prescribed time again, switches the 5 MHz carrier to the 1.4 MHz carrier, and then operates the 1.4 MHz carrier for a prescribed time in a repetitive manner.

When the 5 MHz carrier is used, a communication service with good throughput is provided, so that it is possible to prevent interference to another wireless communication system.

During the operation, the control unit 35 performs the carrier sensing (S13) and determines whether another wireless communication system is not detected (S14). When the other wireless communication system is not detected (Yes in S14), the control unit 35 subsequently performs step S12.

When the other wireless communication system is detected, the control unit 35 performs switching to an operation for reducing an influence to the system and continues the operation. In FIG. 5, when the method P is detected in step S14, step S22 is performed. When the method D is detected in step S14, step S31 is performed.

On the other hand, when the method P or the method D is detected in step S11, the control unit 35 determines whether the method D is not detected (S21).

When the method D is not detected, that is, when the method P is detected, the control unit 35 alternately uses a 3 MHz carrier and the 1.4 MHz carrier (S22). For example, in this case, as illustrated in FIG. 3, the control unit 35 operates the 3 MHz carrier for a prescribed time (for example, 3 hours and the like), switches the 3 MHz carrier to the 1.4 MHz carrier, operates the 1.4 MHz carrier for a prescribed time (for example, one hour and the like), operates the 3 MHz carrier for a prescribed time again, switches the 3 MHz carrier to the 1.4 MHz carrier, and then operates the 1.4 MHz carrier for a prescribed time in a repetitive manner.

When the 3 MHz carrier is used, a communication service with good throughput is provided, so that it is possible to prevent interference to another wireless communication system.

During the operation, the control unit 35 performs the carrier sensing (S23) and determines whether another wireless communication system is not detected (S24). When the other wireless communication system is not detected (Yes in S24), the control unit 35 subsequently performs step S11.

When the other wireless communication system is detected, the control unit 35 performs switching to an operation for reducing an influence to the system and continues the operation. In FIG. 5, when the method P is subsequently detected in step S24, step S22 is performed. When the method D is detected in step S24, step S31 is performed.

On the other hand, when the method D is detected in step S21, the control unit 35 uses the 1.4 MHz carrier (S31).

During the operation, the control unit 35 performs the carrier sensing (S32) and determines whether another wireless communication system is not detected (S33). When the other wireless communication system is not detected (Yes in S33), the control unit 35 subsequently performs step S11.

When the other wireless communication system is detected, the control unit 35 performs switching to an operation for reducing an influence to the system and continues the operation. In FIG. 5, when only the method P is detected in step S33, step S21 is performed. When the method D is subsequently detected in step S33, step S31 is performed.

As described above, when another wireless communication system is not using the common band, the base station 30x uses the 3 MHz or 5 MHz carrier of own system, in which throughput is improved in comparison to a carrier having a frequency width of the other wireless communication system. When the other wireless communication system is using the common band, the base station 30x uses the 1.4 MHz of own system, which has a narrower frequency width than the other wireless communication system. Consequently, it is possible to avoid effects of interference to the other wireless communication system in the common band of the wireless communication and to provide a high speed communication service.

In the above, the control unit 35 operates the 3 MHz or 5 MHz carrier for a prescribed time, switches the carrier to the 1.4 MHz carrier, and then operates the 1.4 MHz carrier for a prescribed time; however, in other embodiments, in order to prevent effects of interference to another wireless communication system, the operating time of the 3 MHz or 5 MHz carrier may be initially shortened, and when the other wireless communication system is detected in the carrier sensing, the operating time may be gradually prolonged.

In steps S12 and S22, the 1.4 MHz carrier is alternately used; however, in order to prevent effects of interference to another wireless communication system, when the 1.4 MHz carrier is used, the control unit 35 may gradually increase the 1.4 MHz carrier such that the number of the 1.4 MHz carriers is initially one, next two, then three, then four, and then five.

In step S12, the 5 MHz carrier is used; however, in order to prevent effects of interference to another wireless communication system, the 3 MHz carrier may be initially used, and then the 5 MHz carrier may be used.

Note that the above description is only a specific preferred embodiment for the purpose of the description and the example of the invention. Accordingly, the invention is not limited to the aforementioned embodiment and includes many changes and modifications within a range without departing from its essence.

This application is based upon Japanese Patent Application (Japanese Patent Application No. 2015-158698) filed on Aug. 11, 2015, the entire contents of which are incorporated by citation. Furthermore, all references cited herein are incorporated as a whole.

REFERENCE SIGNS LIST 10p, 10x, 10d: wireless terminal
20p, 20x, 20d: control device
30p, 30x, 30d: base station
31, 32: radio unit
33: detection unit
34: signal processing unit
35: control unit
36: line unit

The invention claimed is:

1. A base station of a wireless communication system that commonly uses the same frequency band with another wireless communication system, comprising:
   a controller,
   wherein, when the other wireless communication system does not use the frequency band, the controller uses a carrier of a wide frequency width of own system, in which throughput is improved in comparison to a carrier having a frequency width of the other wireless communication system, and
   when the other wireless communication system uses the frequency band, the controller uses a carrier of a narrow frequency width of own system, which is narrower than the frequency width of the other wireless communication system,
   wherein the other wireless communication system includes a first wireless communication system and a second wireless communication system having a carrier using a narrower frequency width than a carrier of a frequency width of the first wireless communication system, and
   when the first wireless communication system does not use the frequency band and the second wireless communication system uses the frequency band, the controller uses a carrier of an intermediate frequency width of own system, in which throughput is improved in comparison to the frequency width of the other wireless communication system, the intermediate frequency width being narrower than the wide frequency width.

2. The base station according to claim 1,
   wherein, when the other wireless communication system does not use the frequency band, the controller alternately uses the carrier of the wide frequency width and the carrier of the narrow frequency width by temporally switching the carrier of the wide frequency width and the carrier of the narrow frequency width.

3. The base station according to claim 1, wherein, when the first wireless communication system does not use the frequency band and the second wireless communication system uses the frequency band, the controller alternately uses the carrier of the intermediate frequency width and the carrier of the narrow frequency width by temporally switching the carrier of the intermediate frequency width and the carrier of the narrow frequency width.

4. The base station according to claim 2, wherein, when the carrier of the wide frequency width is used, the controller gradually increases usage time for the carrier of the wide frequency width.

5. A wireless communication method of a wireless communication system that commonly uses the same frequency band with another wireless communication system, comprising steps of:
   using a carrier of a wide frequency width of own system, in which throughput is improved in comparison to a frequency width of the other wireless communication system, when the other wireless communication system does not use the frequency band; and
   using a carrier of a narrow frequency width of own system, which is narrower than the frequency width of the other wireless communication system, when the other wireless communication system uses the frequency band,
   wherein the other wireless communication system includes a first wireless communication system and a second wireless communication system having a carrier using a narrower frequency width than a carrier of a frequency width of the first wireless communication system, and the method further comprises, when the first wireless communication system does not use the frequency band and the second wireless communication system uses the frequency band, using a carrier of an intermediate frequency width of own system, in which throughput is improved in comparison to the frequency width of the other wireless communication system, the intermediate frequency width being narrower than the wide frequency width.

6. A base station of a wireless communication system that commonly uses the same frequency band with another wireless communication system, comprising:

a control unit;

a first radio unit that performs wireless communication by using a wireless communication method of own system;

a second radio unit that performs carrier sensing during communication of the first radio unit; and a detection unit that detects a carrier from a radio signal and outputs carrier sensing information when the carrier sensing is performed to the control unit, wherein, when the other wireless communication system does not use the frequency band, the control unit uses a carrier of a wide frequency width of own system, in which throughput is improved in comparison to a carrier having a frequency width of the other wireless communication system, and when the other wireless communication system uses the frequency band, the control unit uses a carrier of a narrow frequency width of own system, which is narrower than the frequency width of the other wireless communication system, wherein the other wireless communication system includes a first wireless communication system and a second wireless communication system having a carrier using a narrower frequency width than a carrier of a frequency width of the first wireless communication system, and when the first wireless communication system does not use the frequency band and the second wireless communication system uses the frequency band, the control unit uses a carrier of an intermediate frequency width of own system, in which throughput is improved in comparison to the frequency width of the other wireless communication system, the intermediate frequency width being narrower than the wide frequency width.

* * * * *